US012776146B2

(12) United States Patent
Ibanez et al.

(10) Patent No.: US 12,776,146 B2
(45) Date of Patent: Oct. 27, 2026

(54) INTELLIGENT REAL-TIME INFORMATION INGESTION SYSTEM AND METHOD

(71) Applicant: BNSF Railway Company, Fort Worth, TX (US)

(72) Inventors: Michael I. Ibanez, McAllen, TX (US); Bowen T. Kruse, Helena, MT (US)

(73) Assignee: BNSF Railway Company

( * ) Notice: Subject to any disclaimer, the term of this patent is extended or adjusted under 35 U.S.C. 154(b) by 104 days.

(21) Appl. No.: 18/435,667

(22) Filed: Feb. 7, 2024

(65) Prior Publication Data

US 2025/0252752 A1 Aug. 7, 2025

(51) Int. Cl.

*G06V 20/56* (2022.01)
*G01S 19/14* (2010.01)
(Continued)

(52) U.S. Cl.

CPC .............. *G06V 20/56* (2022.01); *G01S 19/14* (2013.01); *G06T 7/70* (2017.01); *G06V 10/70* (2022.01);
(Continued)

(58) Field of Classification Search

CPC ........ G06V 20/56; G06V 20/62; G06V 10/70; G06V 30/191; G06T 7/70;
(Continued)

(56) References Cited

U.S. PATENT DOCUMENTS

| | | | |
|---|---|---|---|
| 5,780,826 | A | 7/1998 | Hareyama et al. |
| 7,231,065 | B2 | 6/2007 | Peach et al. |

(Continued)

FOREIGN PATENT DOCUMENTS

| | | |
|---|---|---|
| CN | 113496563 | 10/2021 |
| CN | 115497057 A | 12/2022 |

(Continued)

OTHER PUBLICATIONS

Written Opinion and International Search Report issued in PCT/US2025/014813 issued by the European Patent Office, mailed May 14, 2025, 13 pages.

*Primary Examiner* — Allen C Wong
(74) *Attorney, Agent, or Firm* — Whitaker Chalk Swindle & Schwartz PLLC; Bradley J. Birchfield; Enrique Sanchez, Jr.

(57) ABSTRACT

According to some embodiments, a method by a computing system includes accessing a plurality of images captured by an imaging device. The imaging device and the computing system are coupled to a vehicle that moves within an intermodal container yard. The method further includes determining, by analyzing the plurality of images using a machine-learning module, that a shipping container is depicted within at least one of the plurality of images. The method further includes determining, using a map of the intermodal container yard, a parking location of the shipping container. The method further includes electronically communicating, in response to determining that the shipping container is depicted within at least one of the plurality of images, a message comprising data about the shipping container. The data includes the determined parking location of the shipping container and one or more identification markings of the shipping container.

16 Claims, 6 Drawing Sheets

(51) Int. Cl.

| | |
|---|---|
| ***G06T 7/70*** | (2017.01) |
| ***G06V 10/70*** | (2022.01) |
| ***G06V 20/62*** | (2022.01) |
| ***G06V 30/19*** | (2022.01) |
| ***H04N 7/18*** | (2006.01) |

(52) U.S. Cl.
CPC ............ *G06V 20/62* (2022.01); *G06V 30/191* (2022.01); *H04N 7/183* (2013.01); *G06T 2207/30204* (2013.01); *G06T 2207/30252* (2013.01)

(58) Field of Classification Search
CPC . G06T 2207/30204; G06T 2207/30252; G01S 19/14; H04N 7/183
USPC .......................................................... 348/148
See application file for complete search history.

(56) References Cited

U.S. PATENT DOCUMENTS

| | | | | |
|---|---|---|---|---|
| 7,508,956 | B2 | 3/2009 | Scheppmann | |
| 8,189,919 | B2 | 5/2012 | Lee et al. | |
| 8,630,443 | B2 | 1/2014 | Tan et al. | |
| 8,949,046 | B2 | 2/2015 | Tan et al. | |
| 9,147,175 | B2 | 9/2015 | Schmidt et al. | |
| 9,530,114 | B2 | 12/2016 | King et al. | |
| 9,989,669 | B2 | 6/2018 | Slovik | |
| 10,108,157 | B1 | 10/2018 | Raghavan et al. | |
| 10,346,790 | B1 | 7/2019 | Seaman et al. | |
| 10,572,739 | B2 | 2/2020 | Leizerovich et al. | |
| 10,671,856 | B1 | 6/2020 | Ren et al. | |
| 11,288,624 | B2 | 3/2022 | Ayoub | |
| 11,565,420 | B2 | 1/2023 | Grundfest et al. | |
| 2013/0002879 | A1* | 1/2013 | Weber .................. | G08B 13/248 340/572.1 |
| 2016/0094793 | A1* | 3/2016 | Westmacott ........... | H04N 23/61 348/159 |
| 2019/0026915 | A1* | 1/2019 | Seaman ............... | G06V 30/424 |
| 2020/0254619 | A1 | 8/2020 | Grundfest et al. | |
| 2020/0327472 | A1* | 10/2020 | Anderson ........ | G06Q 10/06315 |
| 2022/0019960 | A1 | 1/2022 | Skomra et al. | |
| 2022/0198893 | A1 | 6/2022 | Khan et al. | |
| 2023/0040565 | A1 | 2/2023 | Naslavsky et al. | |

FOREIGN PATENT DOCUMENTS

| | | | | |
|---|---|---|---|---|
| WO | 20190534491 A1 | | 3/2019 | |
| WO | 2021000339 A1 | | 1/2021 | |
| WO | 2021258195 A1 | | 12/2021 | |
| WO | 2022051329 A1 | | 3/2022 | |
| WO | 2022066153 A1 | | 3/2022 | |
| WO | 2023017445 A1 | | 2/2023 | |
| WO | 2023107584 A1 | | 6/2023 | |
| WO | WO 2023107584 | * | 6/2023 | ............. G06Q 10/08 |

* cited by examiner

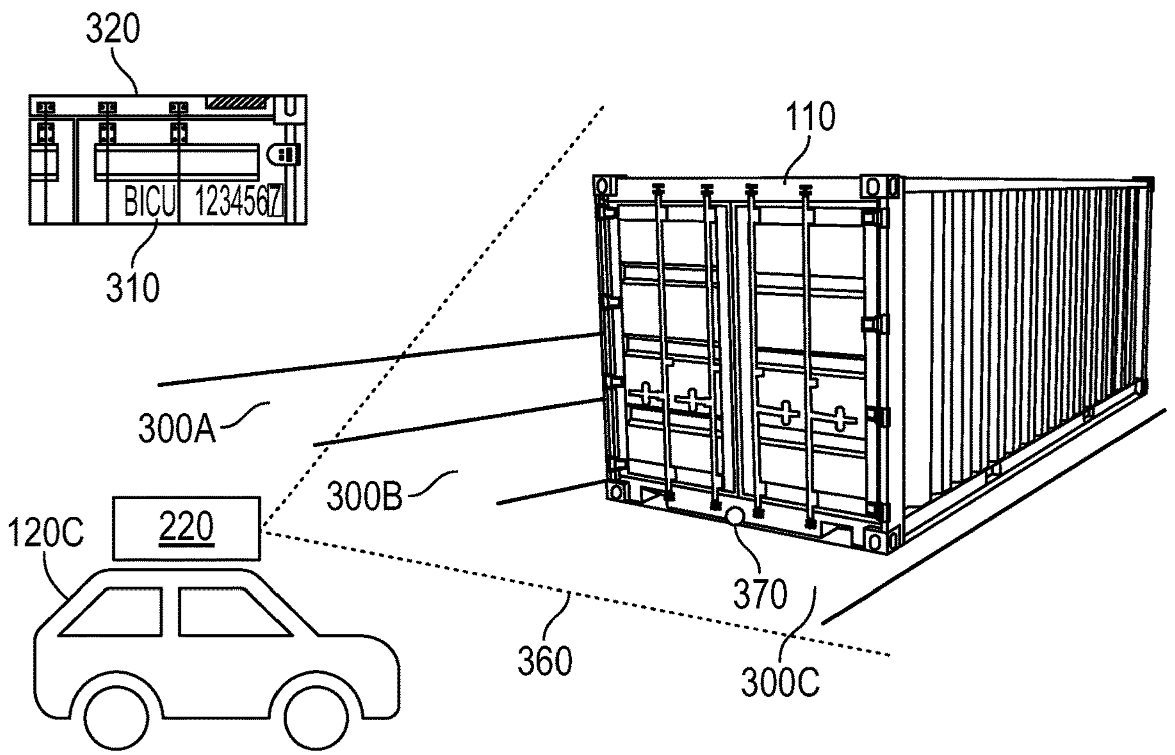

FIG. 3

400

Start

Access images captured by an imaging device — 410

Determine that a shipping container is depicted within at least one of the images — 420

Determine a parking location of the shipping container — 430

In response to determining that the shipping container is depicted within at least one of the images, electronically communicate a message comprising data about the shipping container — 440

End

FIG. 4

INTELLIGENT REAL-TIME INFORMATION INGESTION SYSTEM AND METHOD

TECHNICAL FIELD

This disclosure generally relates to intermodal logistics, and more specifically to intermodal inventory imaging systems and methods.

BACKGROUND

An intermodal container yard can be a facility in which shipping containers are transferred between trucks and trains. Most intermodal container yards include large storage areas where shipping containers are stored. For example, a truck may enter an intermodal container yard and be instructed to park a shipping container in a designated parking spot. For various reasons, however, a truck driver may not park a shipping container in the requested parking location. As a result, a "yard check" may be utilized by the intermodal container yard to ensure that shipping containers can be located when needed for loading on a train. Yard checks are typically performed by workers that visually observe the units within a yard (e.g., trailers, containers, etc.) and their locations (e.g., lot/row/spots) and manually enter the observed information in an inventory database. Manual yard checks, however, are time consuming, monotonous, and prone to frequent errors.

SUMMARY

The present disclosure achieves technical advantages as systems, methods, and computer-readable storage media that provide functionality for imaging and identifying inventory such as shipping containers of a rail yard. The present disclosure provides for a system integrated into a practical application with meaningful limitations that may include accessing a plurality of images captured by an imaging device and determining, by analyzing the plurality of images using a machine-learning module, that a shipping container is depicted within at least one of the plurality of images. Other meaningful limitations of the system integrated into a practical application include: determining, using a map of the intermodal container yard, a parking location of the shipping container; and in response to determining that the shipping container is depicted within at least one of the plurality of images, electronically communicating, across a communications network, a message comprising data about the shipping container.

The present disclosure solves the technological problem of a lack of technical functionality for rail yard checks in current systems by providing methods and system that automatically determine the identifications and locations of shipping containers within a rail yard. The technological solutions provided herein, and missing from conventional systems, are more than a mere application of a manual process to a computerized environment, but rather include functionality to implement a technical process to supplement current manual solutions for performing yard checks and to augment current inventory systems by providing a mechanism for automatically determining the identifications and locations of shipping containers within a rail yard. In doing so, the present disclosure goes well beyond a mere application the manual process to a computer.

Unlike existing solutions where personnel may be required to manually traverse a rail yard and manually enter identifications and locations of shipping containers parked in the rail yard, embodiments of this disclosure provide systems and methods that automatically determine the identifications and locations of shipping containers within a rail yard (e.g., using aerial or ground-based vehicles). By providing automatic determination and validation of shipping container inventory and locations, a facility such as a rail yard may be more efficiently and effectively monitored. This may increase the efficiency of the facility and reduce or eliminate the requirement for personnel to manually perform yard checks. This may reduce resource usage (e.g., fuel and electricity) that would otherwise be required by manual yard checks. Furthermore, by providing systems that only transmit data in response to certain events (e.g., the detection of a shipping container in an image), network bandwidth and computer resources (e.g., computer memory and processing power) may be optimized or reduced over existing systems. Other technical advantages will be readily apparent to one skilled in the art from the following figures, descriptions, and claims. Moreover, while specific advantages have been enumerated above, various embodiments may include all, some, or none of the enumerated advantages.

Accordingly, the present disclosure discloses concepts inextricably tied to computer technology such that the present disclosure provides the technological benefit of implementing functionality to automatically manage inventory such as intermodal inventory of a rail yard. The systems and techniques of embodiments provide improved systems by providing capabilities to perform functions that are currently performed manually and to perform functions that are currently not possible.

It is an object of the disclosure to provide systems for automatically managing inventory of physical objects such as shipping containers in a rail yard. It is a further object of the disclosure to provide methods of automatically managing inventory of physical objects such as shipping containers in a rail yard. These and other objects are provided by the present disclosure, including at least the following embodiments.

In one particular embodiment, a system includes an imaging device, a communications interface, one or more memory units storing a map of an intermodal container yard, and one or more computer processors communicatively coupled to the one or more memory units. The one or more computer processors are configured to access a plurality of images captured by the imaging device. The one or more computer processors are further configured to determine, by analyzing the plurality of images using a machine-learning module, that a shipping container is depicted within at least one of the plurality of images. The one or more computer processors are further configured to determine, using the map of the intermodal container yard, a parking location of the shipping container. The one or more computer processors are further configured to electronically communicate, in response to determining that the shipping container is depicted within at least one of the plurality of images, a message that includes data about the shipping container. The data includes the determined parking location of the shipping container and one or more identification markings of the shipping container.

In another embodiment, a method by a computing system includes accessing a plurality of images captured by an imaging device. The imaging device and the computing system are coupled to a vehicle that moves within an intermodal container yard. The method further includes determining, by analyzing the plurality of images using a machine-learning module, that a shipping container is depicted within at least one of the plurality of images. The method further includes determining, using a map of the intermodal container yard, a parking location of the shipping container. The method further includes electronically communicating, in response to determining that the shipping container is depicted within at least one of the plurality of images, a message comprising data about the shipping container. The data includes the determined parking location of the shipping container and one or more identification markings of the shipping container In another embodiment, a system for imaging shipping containers in an intermodal container yard includes a first inventory imaging system coupled to a container delivery vehicle and a second inventory imaging system coupled to a dedicated imaging vehicle. The first inventory imaging system includes one or more first computer processors configured to access a first plurality of images that are captured by the first inventory imaging system while the container delivery vehicle moves shipping containers around the intermodal container yard. The one or more first computer processors are further configured to determine, by analyzing the first plurality of images using a first machine-learning module, that a first shipping container is depicted within at least one of the first plurality of images. The one or more first computer processors are further configured to electronically communicate, in response to determining that the first shipping container is depicted within at least one of the first plurality of images, a first message that includes data about the first shipping container to a remote computing system. The second inventory imaging system includes one or more second computer processors configured to access a second plurality of images that are captured by the second inventory imaging system while the dedicated imaging vehicle drives a dedicated route to image the intermodal container yard. The one or more second computer processors are further configured to determine, by analyzing the second plurality of images using a second machine-learning module, that a second shipping container is depicted within at least one of the second plurality of images. The one or more second computer processors are further configured to electronically communicate, in response to determining that the second shipping container is depicted within at least one of the second plurality of images, a second message that includes data about the second shipping container to the remote computing system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 3 is a diagram illustrating inventory imaging system determining a parking location of a shipping container, according to particular embodiments.

FIG. 4 is a flow diagram illustrating an example method for managing intermodal inventory, according to particular embodiments.

Figure 1:
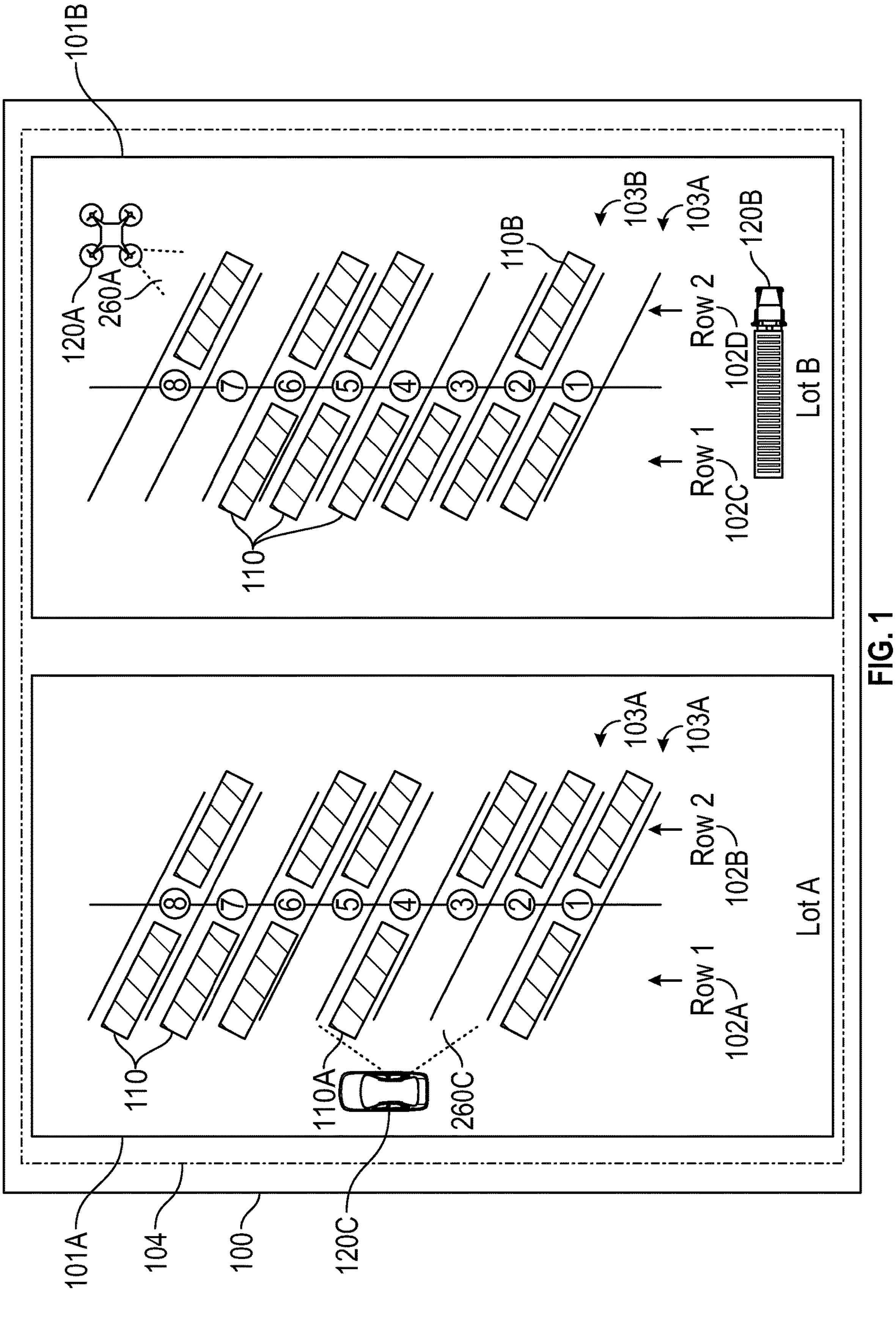
FIG. 1 is a diagram illustrating an overhead view of a container yard, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, the issuance of this patent is evidence that: the elements and limitations presented in the claims are enabled by the specification and drawings, the issued claims are directed toward patent-eligible subject matter, and the prior art fails to disclose or teach the claims as a whole, such that the issued claims of this patent are patentable under the applicable laws and rules of this country.

An intermodal container yard can be a facility in which shipping containers are transferred between trucks and trains. Most intermodal container yards include vast storage areas where shipping containers are stored. For example, a truck may enter an intermodal container yard and be instructed to park a shipping container in a designated parking spot. For various reasons, however, a truck driver may not park a shipping container in the requested parking location. As a result, a "yard check" may be utilized by the intermodal container yard to ensure that shipping containers can be located when needed for loading on a train. Yard checks are typically performed by workers that visually observe the units within a yard (e.g., trailers, containers, etc.) and their locations (e.g., lot/row/spots) and manually enter the observed information in an inventory database. Manual yard checks, however, are time consuming, monotonous, and prone to frequent errors.

To address these and other problems with managing inventory such as shipping containers stored in intermodal container yards, the disclosed embodiments provide systems and methods for imaging and identifying intermodal inventory. In some embodiments, the disclosed systems and methods utilize one or more inventory imaging systems that may be moved around within a container yard to ingest information about the container yard. For example, an inventory imaging system may be attached to a container delivery vehicle (e.g., a railroad hostler vehicle) and may capture information about a subset of the containers in the container yard as the container delivery vehicle moves containers between trains and parking spots within the container yard. As another example, an inventory imaging system may be attached to a dedicated imaging vehicle (e.g., an aerial vehicle such as a drone, an automobile, a truck, a golf cart, an all-terrain vehicle (ATV), an autonomous vehicle, a motorcycle, a remote-control vehicle, and the like) and may capture information about the complete inventory of containers in the container yard as the dedicated imaging vehicle traverses a dedicated route through the entire container yard. The inventory imaging systems may include a computing system and an imaging device (e.g., a camera). The inventory imaging systems may be configured to utilize an onboard machine-learning module to continuously analyze images captured by the imaging device and identify containers in the images. Once a container has been identified, the inventory imaging system may send a message to a remote computing system about the identified container (e.g., parking location, unit identification markings, etc.) By automatically performing image analysis (e.g., machine learning inference) in real time by the inventory imaging system directly on the imaging vehicle, shipping containers and their associated information (e.g., parking locations and identification markings) may be updated in inventory much quicker (e.g., in real-time or near real-time) than other systems that rely on back-end servers for image processing. Furthermore, some embodiments of the disclosed inventory imaging systems conserve network bandwidth by only electronically transmitting information when an event of interest occurs (e.g., in response to identifying a container within captured images). These and other features and advantages of the disclosed embodiments are discussed in more detail below.

FIG. 1 is a diagram illustrating an overhead view of a container yard 100, according to particular embodiments. In general, container yard 100 can be an area within an intermodal rail yard for storing shipping containers 110. Shipping containers 110 may be parked in a specific location (e.g., parking location 300) that can be identified by a lot 101, a row 102, and a spot 103. For example, shipping container 110A can be parked in lot 101A ("A"), row 102A ("1"), and spot 103A ("1"). As another example, shipping container 110B can be parked in lot 101B ("B"), row 102D ("2"), and spot 103B ("2"). Shipping containers 110 may be any appropriate containers that may be transported and parked within container yard 100. In some embodiments, shipping containers 110 are intermodal shipping containers that are able to be transported by both rail and truck.

In addition to shipping containers 110, container yard 100 includes one or more imaging vehicles 120. In general, imaging vehicles 120 have attached imaging systems (e.g., inventory imaging system 220) that capture and analyze images of container yard 100 and transmit messages 125 about shipping containers 110 to a remote computing system. In the illustrated embodiments, imaging vehicles 120 include an imaging vehicle 120A, an imaging vehicle 120B, and an imaging vehicle 120C. Imaging vehicle 120A can be an aerial vehicle (e.g., a drone, a remote-control (RC) airplane, etc.) with one or more attached inventory imaging systems. Imaging vehicle 120B can be a container delivery vehicle (e.g., a hostler vehicle, a tractor, a truck, etc.) with one or more attached inventory imaging systems. Imaging vehicle 120C can be any other ground vehicle (e.g., an automobile, a utility vehicle, an RC vehicle, etc.) with one or more attached inventory imaging systems.

In general, the inventory imaging systems that are attached to imaging vehicles 120 are systems and devices that capture and analyze images of container yard 100 in order to identify shipping containers 110 and their locations within container yard 100. In some embodiments, imaging vehicles 120 (e.g., imaging vehicles 120A-120C) move about container yard 100 and capture images or videos of shipping containers 110. The inventory imaging systems then process the captured images or videos in real-time using machine learning model inferencing in order identify shipping containers 110 within the captured images or videos. Once a shipping container 110 is identified, the inventory imaging systems may additionally determine one or more unit identifications and a parking location of the identified shipping container 110. The determined unit identifications and the parking location of the shipping container 110 are then electronically communicated to a remote computer system and used for updating a database of the inventory of container yard 100. More details about the inventory imaging systems that may be attached to imaging vehicles 120 are discussed in more detail below.

Figure 2:
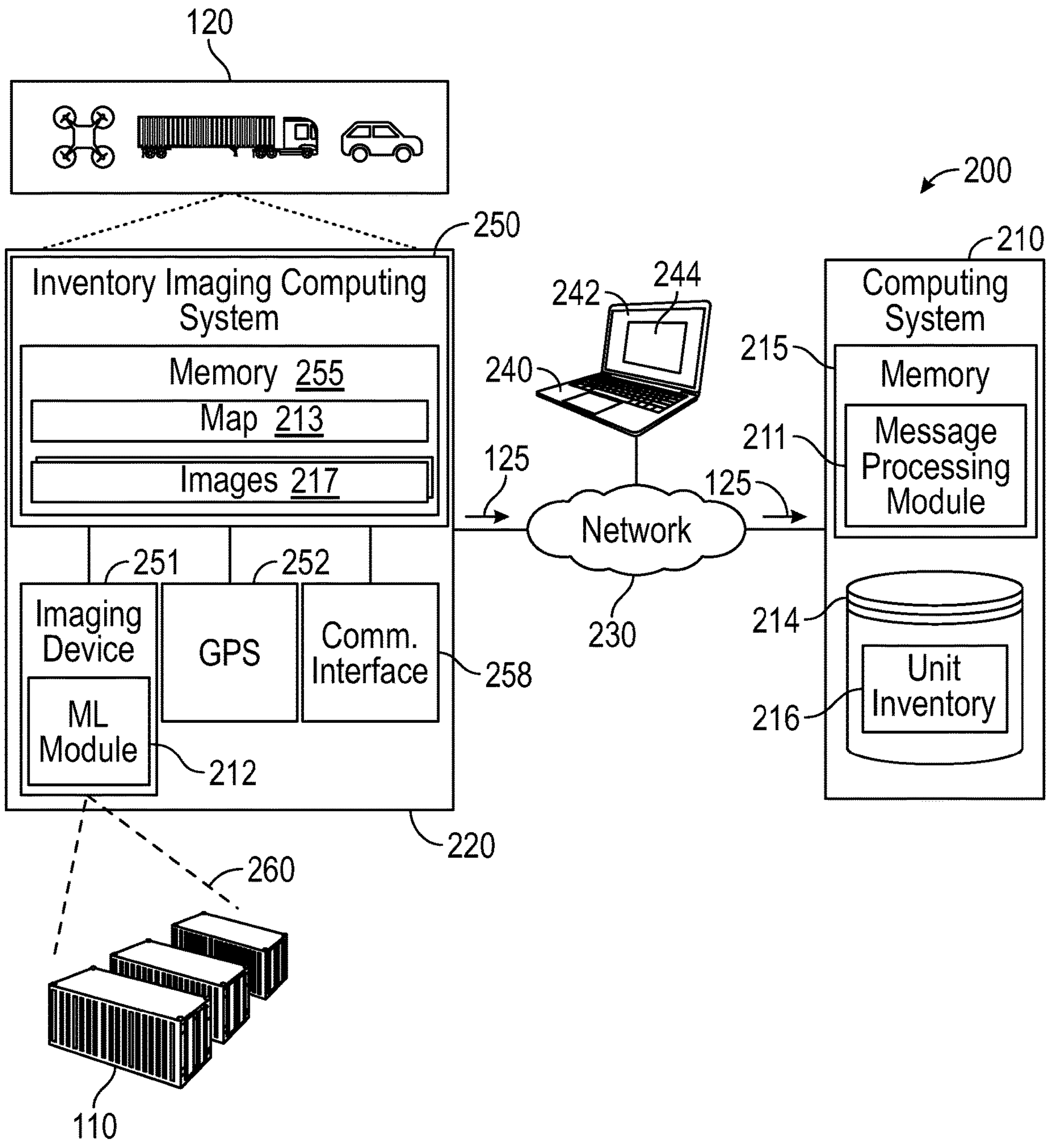
FIG. 2 is a diagram illustrating an intermodal inventory management system for managing the inventory of the container yard of FIG. 1, according to particular embodiments.

FIG. 2 is a diagram illustrating an intermodal inventory management system 200 for imaging and identifying the inventory of container yard 100, according to particular embodiments. Intermodal inventory management system 200 includes a remote computing system 210, one or more inventory imaging systems 220, and a user computing system 240, all of which are communicatively coupled via a network 230. Remote computing system 210 includes memory 215 and inventory database 214. Memory 215 stores message processing module 211 and inventory database 214 stores unit inventory 216. Inventory imaging computing system 250 is attached to an imaging vehicle 120 and includes memory 255, imaging device 251 that stores a machine learning module 212, GPS module 252, and communications interface 258. Memory 255 stores a map 213 and images 217.

In general, inventory imaging system 220 captures and analyzes images 217 as imaging vehicle 120 moves within container yard 100 in order to determine parking locations of shipping containers 110. To do so, inventory imaging system 220 may first analyze images 217 captured by imaging device 251 using machine learning module 212 in order to determine that a shipping container 110 is depicted in at least one image 217. Inventory imaging system 220 may then determine, using map 213 of the container yard 100, a parking location of the shipping container 110 identified in images 217. In response to determining that the shipping container 110 is depicted within at least one image 217, inventory imaging system 220 may electronically communicate to remote computing system 210 (e.g., across network 230 using communications interface 258) a message 125 about the identified shipping container 110. The message 125 sent to remote computing system 210 may include data such as the determined parking location of the identified shipping container 110 and one or more identification markings of the identified shipping container 110. In order to conserve network bandwidth, some embodiments of inventory imaging system 220 send message 125 only if machine learning module 212 identifies shipping container 110 within images 217. Once message 125 is received by remote computing system 210, message processing module 211 updates unit inventory 216 using the data within message 125. More details about the operation of inventory imaging system 220 are discussed below.

Messages 125 can be information provided by inventory imaging system 220 to intermodal inventory management system 200. In general, each message 125 provides data/information about a shipping container 110 within container yard 100. In some embodiments, message 125 includes a unit identification number of a particular shipping container 110 and a parking location of the particular shipping container 110 within container yard 100. For example, when inventory imaging system 220 determines that shipping container 110A has a unit identification number of "BICU 123456" and is parked in lot/row/spot location of A-1-1 as illustrated in FIG. 1, inventory imaging system 220 may send a message 125 to intermodal inventory management system 200 that includes the unit identification number of "BICU 123456" and lot/row/spot location of A-1-1. As another example, when inventory imaging system 220 determines that shipping container 110B has a unit identification number of "BICU 654321" and is parked in lot/row/spot location of B-2-2 as illustrated in FIG. 1, yard check source 120B may send a message 125 to intermodal inventory management system 200 that includes the unit identification number of "BICU 654321" and lot/row/spot location of B-2-2.

Message 125 can include any format, including JavaScript Object Notation (JSON), TCP/IP, XML, HTML, ASCII, SMS, CSV, API, or other suitable format. Each message 125 can consist of a message header, header properties, and a message body, or be encapsulated and packetized by any suitable format. In some embodiments, messages 125 are sent via a distributed event streaming platform such as APACHE KAFKA.

In some embodiments, intermodal inventory management system 200 includes a message processing module 211. In general, message processing module 211 processes messages 125 received from inventory imaging system 220 and stores the data within messages 125 about shipping containers 110 in unit inventory 216. Message processing module 211 represents any suitable set of instructions, logic, or code embodied in a computer-readable storage medium. For example, message processing module 211 may be embodied in memory 215, a disk, a CD, or a flash drive. In particular embodiments, message processing module 211 may include instructions (e.g., a software application) executable by processor to perform one or more of the functions described herein.

Machine learning module 212 can be any hardware, software, or combination of hardware and software that is capable of analyzing images 217 in order to identify shipping containers 110 within images 217 in real-time or near real-time. In some embodiments, machine learning module 212 includes one or more neural networks that have been trained to perform object detection, inference, and recognition on images 217 in order to identify shipping containers 110.

Map 213 is stored information about the physical properties of container yard 100. In some embodiments, map 213 includes information about the parking locations of container yard 100. For example, map 213 may include GPS coordinates of each parking location. As a specific example, map 213 may include GPS coordinates of the four corners of a rectangle that overlays each parking location within container yard 100 (e.g., lot/row/spot location of A-1-1 as illustrated in FIG. 1). In some embodiments, map 213 is a geographic information system (GIS) map.

Inventory database 214 of remote computing system 210 may store certain types of information for remote computing system 210 and message processing module 211. Inventory database 214 may be any one or a combination of volatile or non-volatile local or remote devices suitable for storing information. Inventory database 214 may include RAM, ROM, magnetic storage devices, optical storage devices, or any other suitable information storage device or a combination of these devices. Inventory database 214 may be a component external or internal to remote computing system 210. Inventory database 214 may be located in any location suitable for inventory database 214 to store information for remote computing system 210. For example, inventory database 214 may be located in a cloud environment. In general, inventory database 214 stores unit inventory 216, which includes data from messages 125 (e.g., parking locations of shipping containers 110 and unit identifications of shipping containers 110).

Images 217 are captured by imaging device 251 and may be stored in memory 255. Images 217 may be still images or may be videos. Images 217 may be in an appropriate data format and may be of any appropriate resolution and size.

Imaging device 251 is any appropriate system or device to capture images 217 of shipping containers 110 within container yard 100. In some embodiments, imaging device 251 is a high-resolution camara from LUXONIS that includes built-in functionality for machine learning (e.g., via machine learning module 212) and depth vision. In some embodiments, imaging device 251 includes a field of view 260 that may be directed at a known direction away from imaging vehicle 120 such that it captures shipping containers 110 as imaging vehicle 120 moves along rows 102 of container yard 100.

GPS module 252 can be any appropriate system, device, or application to communicate with one or more satellites to determine Global Positioning System (GPS) coordinates of inventory imaging system 220. The GPS coordinates may be the current latitude, longitude, and altitude of inventory imaging system 220. In some embodiments, GPS module 252 is any typical GPS receiver.

Communications interface 258 may be any hardware, software, or combination of hardware and software that provides one or more wireless interfaces (e.g., WI-FI, cellular, Bluetooth, etc.) between inventory imaging system 220 and network 230. In some embodiments, communications interface 258 provides a WI-FI interface over LTE (or any other cellular communications standard). In some embodiments, communications interface 258 may be communication interface 610 that is discussed in more detail below with respect to FIG. 6.

In some embodiments, inventory imaging system 220 may additionally include one or more illumination devices (not illustrated) that are configured to illuminate shipping containers 110 as imaging vehicle 120 moves within container yard 100. For example, inventory imaging system 220 may include one or more LED lights attached to imaging vehicle 120 and pointed towards shipping containers 110. As anther example, inventory imaging system 220 may include one or more infrared lights attached to imaging vehicle 120 and pointed towards shipping containers 110.

As discussed above, inventory imaging system 220 are systems and devices configured to capture and analyze images of container yard 100 in order to identify shipping containers 110 and their locations within container yard 100. In some embodiments, inventory imaging system 220 is coupled to an imaging vehicle 120 that moves within container yard 100. In other embodiments, however, inventory imaging system 220 may be attached to other objects within container yard 100. For example, inventory imaging system 220 may be attached to a stationary object that is in close proximity to an entrance/exit of container yard 100 in order to analyze shipping containers 110 as they enter/exit container yard 100. As another example, inventory imaging system 220 may be attached to a crane that loads/unloads shipping container 110 from a train. In general, inventory imaging system 220 may be located on any mobile or stationary object in order to capture and analyze images of container yard 100 in order to identify shipping containers 110 and their locations within container yard 100.

Network 230 allows communication between and amongst the various components of intermodal inventory management system 200. This disclosure contemplates network 230 being any suitable network operable to facilitate communication between the components of intermodal inventory management system 200. Network 230 may include any interconnecting system capable of transmitting audio, video, signals, data, messages, or any combination of the preceding. Network 230 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

User computing system 240 can be any appropriate system or device that allows a user to interact with intermodal inventory management system 200. User computing system 240 may be a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In some embodiments, user computing system 240 includes an electronic display 242 such as computer or smartphone screen. In some embodiments, user computing system 240 may be configured to provide an interface (e.g., GUI 244) that can be structured to facilitate an operator interacting with intermodal inventory management system 200, e.g., via network 230, to execute and leverage the features provided by intermodal inventory management system 200.

In operation, intermodal inventory management system 200 utilizes one or more inventory imaging systems 220 to capture and analyze images 217 as the one or more imaging vehicles 120 move within container yard 100 in order to determine parking locations of shipping containers 110. To do so, inventory imaging system 220 may first capture images 217 using imaging device 251 as imaging vehicle 120 moves around container yard 100. After capturing images 217, inventory imaging system 220 analyzes images 217 using machine learning module 212 in order to determine in real-time (or near-real time) that a shipping container 110 is depicted in at least one of images 217. Inventory imaging system 220 may then determine, using map 213 of the container yard 100, a parking location of the shipping container 110 identified in images 217. More details about how certain embodiments determine the parking location of a shipping container 110 are discussed below in reference to FIG. 3.

In response to determining that the shipping container 110 is depicted within at least one image 217, inventory imaging system 220 may electronically communicate to remote computing system 210 (e.g., across network 230 using communications interface 258) a message 125 about the identified shipping container 110. The message 125 sent to remote computing system 210 may include data such as the determined parking location of the identified shipping container 110 and one or more identification markings of the identified shipping container 110. More details about how certain embodiments determine the identification markings of a shipping container 110 are discussed below in reference to FIG. 3. Once message 125 is received by remote computing system 210, message processing module 211 updates unit inventory 216 using the data within message 125.

In order to conserve network bandwidth, battery power, and computer processing/memory resources, some embodiments of inventory imaging system 220 send messages 125 only when objects of interest are discovered in captured images 217. For example, some embodiments only send messages 125 in response to machine learning module 212 identifying shipping containers 110 within images 217 (i.e., a message 125 is sent by inventory imaging system 220 after each new shipping container 110 is identified within images 217, but otherwise inventory imaging system 220 does not use communications interface 258 in order to conserve resources).

By performing object detection in machine learning module 212 directly within imaging device 251 instead of a back-end server system such as remote computing system 210, embodiments of this disclosure offer significant advantages over other systems. Since inventory imaging system 220 may utilize machine learning module 212 and imaging device 251 to detect shipping containers 110 in real-time as imaging vehicle 120 traverses container yard 100, unit inventory 216 may be updated more quickly and efficiently.

As a result, operators may have a more accurate understanding of the inventory within container yard 100.

In some embodiments, inventory imaging system 220 may additionally conserve resources by utilizing GPS module 252 to determine whether inventory imaging system 220 is currently located within a geofence 104 of container yard 100 (as illustrated in FIG. 1). In these embodiments, inventory imaging system 220 may prevent machine learning module 212 from analyzing images 217 when inventory imaging system 220 is currently located outside geofence 104 of container yard 100. To determine whether inventory imaging system 220 is currently located inside or outside geofence 104 of container yard 100, some embodiments compare the current GPS coordinates of inventory imaging system 220 from GPS module 252 to GPS coordinates of geofence 104. For example, geofence 104 may be in the shape of a square or rectangle and may include GPS coordinates of the four corners of geofence 104. If inventory imaging system 220 determines that the current GPS coordinates of inventory imaging system 220 are within the GPS coordinates of the four corners of geofence 104, inventory imaging system 220 determines that inventory imaging system 220 is currently located inside geofence 104 and thus proceeds to enable machine learning module 212 to analyze images 217 in order to identify shipping containers 110. On the other hand, if inventory imaging system 220 determines that the current GPS coordinates of inventory imaging system 220 are not within the GPS coordinates of the four corners of geofence 104, inventory imaging system 220 determines that inventory imaging system 220 is currently located outside geofence 104 and thus proceeds to disable and prevent machine learning module 212 from analyzing images 217 in order to conserve resources.

FIG. 3 is a diagram illustrating inventory imaging system 220 determining a parking location 300 (e.g., 300A-300C) of a shipping container 110. In general, once machine learning module 212 detects shipping container 110 within one or more images 217 captured by imaging device 251, inventory imaging system 220 then attempts to determine the exact parking location 300 of the detected shipping container 110. To do so, some embodiments first determine a current field of view 360 of imaging device 251 of inventory imaging system 220. Inventory imaging system 220 may determine the current field of view 360 of imaging device 251 by analyzing the current GPS coordinates of the system from GPS module 252. For example, if the current GPS coordinates of the system are (N, W, m) and imaging device 251 has a fixed field of view 260 of 120 degrees facing 90 degrees from the direction of travel of imaging vehicle 120, inventory imaging system 220 may determine the current field of view 360 of imaging device 251 as being 120 degrees located at (N, W, m) and facing 90 degrees from the direction of travel of imaging vehicle 120.

Once inventory imaging system 220 determines current field of view 360 of imaging device 251, inventory imaging system 220 may next determine possible parking locations 300 that are within the current field of view 360 of imaging device 251. In some embodiments, inventory imaging system 220 compares the determined current field of view 360 of imaging device 251 to stored map 213 of container yard 100 in order to determine possible parking locations 300 of the detected shipping container 110. Using the above example, inventory imaging system 220 may overlay the current field of view 360 of 120 degrees located at (N, W, m) and facing 90 degrees from the direction of travel of imaging vehicle 120 onto map 213 and determine that parking locations 300A-300C are within the current field of view 360 of imaging device 251 (as illustrated in FIG. 3).

Once inventory imaging system 220 determines the possible parking locations 300 that are within the current field of view 360 of imaging device 251, inventory imaging system 220 may determine GPS coordinates of each of the possible parking locations. In some embodiments, inventory imaging system 220 may do so by accessing map 213 and determining the GPS coordinates stored in map 213 for each of the possible parking locations. For example, each parking location in map 213 may be a rectangular region that includes GPS coordinates of each of the four corners of the rectangular region.

Next, inventory imaging system 220 may calculate GPS coordinates 370 of the detected shipping container 110 using one or more settings of imaging device 251 and the current GPS coordinates of inventory imaging system 220. In this step, inventory imaging system 220 may first determine the current GPS coordinates of inventory imaging system 220 from GPS module 252. Inventory imaging system 220 may then utilize imaging device 251 to determine a distance from inventory imaging system 220 to shipping container 110. For example, inventory imaging system 220 may in some embodiments utilize one or more settings of the imaging device (e.g., a focal length of imaging device 251 and a resolution of imaging device 251) to determine a distance from inventory imaging system 220 to shipping container 110. In other embodiments, imaging device 251 may include one or more depth sensors within imaging device 251 to determine a distance from inventory imaging system 220 to shipping container 110. Finally, inventory imaging system 220 may calculate GPS coordinates 370 of the detected shipping container 110 by adjusting the current GPS coordinates of inventory imaging system 220 with the determined distance from inventory imaging system 220 to shipping container 110.

After inventory imaging system 220 determines GPS coordinates 370 of the detected shipping container 110, inventory imaging system 220 may then determine the probable parking location 300 of shipping container 110 by comparing the GPS coordinates of each of the possible parking locations with the GPS coordinates of the shipping container. For example, if inventory imaging system 220 determines that the GPS coordinates 370 of the detected shipping container 110 are within the GPS coordinates of the four corners of parking location 300C as illustrated in FIG. 3, inventory imaging system 220 determines that the detected shipping container 110 is currently located in parking location 300C.

In some embodiments, inventory imaging system 220 may determine the probable parking location 300 of shipping container 110 across multiple images 217 and then choose which parking location 300 was determined the most times. For example, consider a scenario where imaging vehicle 120 is moving through container yard 100 and captures ten images 217 where a particular shipping container 110 is detected by machine learning module 212. From the steps discussed above, inventory imaging system 220 determines that the particular shipping container 110 is located in parking location 300A two times, is located in parking location 300B one time, and is located in parking location 300C seven times. In this scenario, inventory imaging system 220 may ultimately decide that the particular shipping container 110 is located in parking location 300C since parking location 300C was chosen the most times out of the ten images.

In some embodiments, inventory imaging system 220 may utilize any appropriate method or algorithm for determining unit identification numbers of shipping containers 110 to include in message 125. For example, FIG. 3 illustrates inventory imaging system 220 determining a unit identification 310 from an image 320. In this example, inventory imaging system 220 captures image 320 of shipping container 110 and then utilizes optical character recognition (OCR) or a machine learning algorithm to analyze image 320 and determine that unit identification 310 of shipping container 110 is "BICU 123456." In other embodiments, inventory imaging system 220 may utilize any other appropriate technique or technology to determine unit identifications 310 (e.g., radio frequency identification (RFID), Bluetooth, WI-FI, etc.).

The functional blocks, and components thereof, of intermodal inventory management system 200 of embodiments of the present disclosure may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

Various components of intermodal inventory management system 200 may illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

Further, the functionalities described with reference to each of the different functional blocks of intermodal inventory management system 200 described herein are provided for purposes of illustration, rather than by way of limitation and that functionalities described as being provided by different functional blocks may be combined into a single component or may be provided via computing resources disposed in a cloud-based environment accessible over a network, such as one of network 230.

FIG. 4 is a flow diagram illustrating an example method 400 for managing intermodal inventory, according to certain embodiments. In some embodiments, the functions illustrated in the example blocks shown in FIG. 4 may be performed by inventory imaging system 220 according to embodiments herein. In some embodiments, the operations of method 400 may be stored as instructions that, when executed by one or more processors, cause the one or more processors to perform the operations of method 400.

Method 400 may be performed by a computing system and may begin in step 410. In step 410, method 400 accesses a plurality of images captured by an imaging device. In some embodiments the plurality of images are images 217 and the imaging device is imaging device 251. In some embodiments, the imaging device and the computing system are coupled to a vehicle such as imaging vehicle 120 that moves within an intermodal container yard. The vehicle may be a container delivery vehicle, an aerial vehicle, an automobile, a truck, a golf cart, an ATV, an autonomous vehicle, a motorcycle, or a remote-control vehicle.

In step 420, method 400 determines, by analyzing the plurality of images using a machine-learning module, that a shipping container is depicted within at least one of the plurality of images. In some embodiments, the machine-learning module is machine learning module 212 that is located within imaging device 251. In some embodiments, step 420 is performed only if the computing system is physically located within a geofence of the intermodal container yard.

In step 430, method 400 determines a parking location of the shipping container. In some embodiments, method 400 uses a map of the intermodal container yard in step 430 to determine the parking location of the shipping container. In some embodiments, the map is map 213. In some embodiments, the parking location is parking location 300.

In some embodiments, step 430 includes determining a current field of view of the imaging device by analyzing the current GPS coordinates of the system. The current GPS coordinates may be obtained from a GPS receiver such as GPS module 252. Step 430 may further include determining, using the determined current field of view of the imaging device and the stored map of the intermodal container yard, a plurality of possible parking locations of the intermodal container yard that are within the field of view of the imaging device. Step 430 may further include determining, from the stored map of the intermodal container yard, GPS coordinates of each of the possible parking locations that are within the field of view of the imaging device. Step 430 may further include calculating GPS coordinates of the shipping container using one or more settings of the imaging device and the current GPS coordinate of the system. The one or more settings of the imaging device may include a focal length of the imaging device and a resolution of the imaging device. Step 430 may further include determining the parking location of the shipping container by comparing the GPS coordinates of each of the possible parking locations with the GPS coordinates of the shipping container.

In step 440, method 400, in response to determining that the shipping container is depicted within at least one of the plurality of images, electronically communicates, across a communications network, a message comprising data about the shipping container. In some embodiments, the message is message 125. In some embodiments, the data about the shipping container includes the determined parking location of the shipping container and one or more identification markings of the shipping container. After step 440, method 400 may end.

Figure 5A:
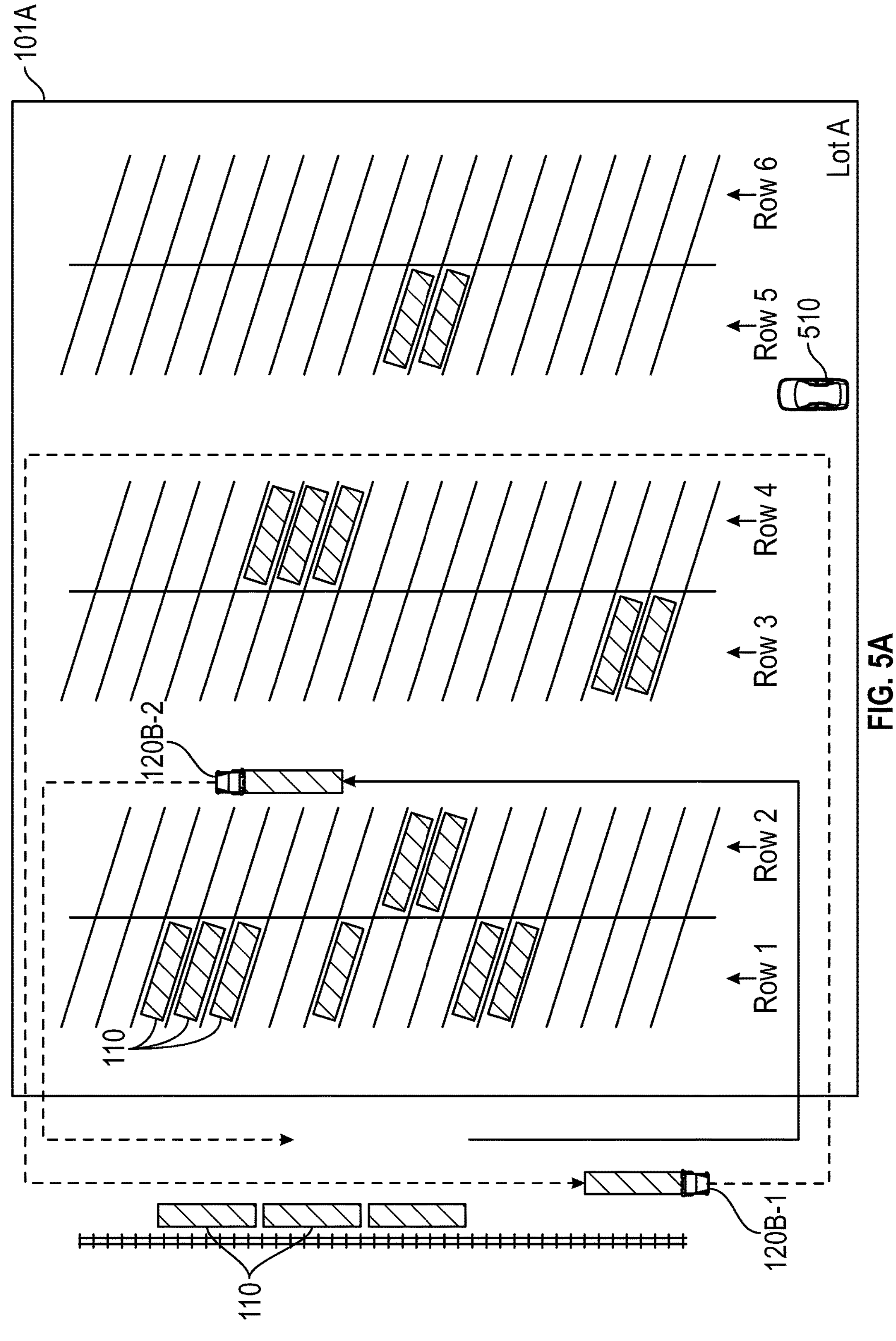
FIGS. 5A and 5B are diagrams illustrating the use of multiple imaging vehicles by an intermodal inventory management system to identify inventory within a container yard, according to particular embodiments.
Figure 5B:
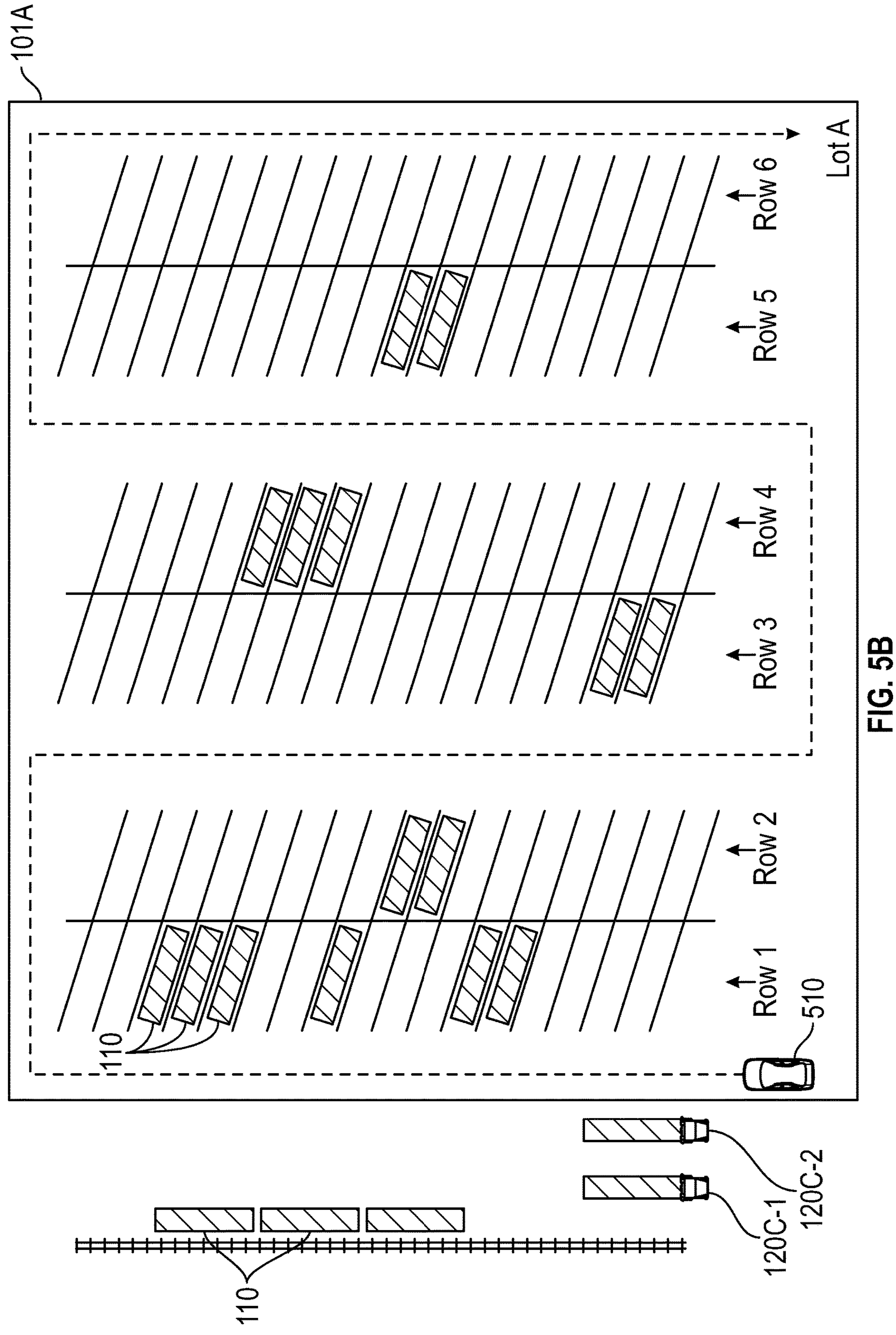

FIGS. 5A and 5B are diagrams illustrating the use of multiple imaging vehicles 120 by intermodal inventory management system 200 to identify inventory within container yard 100, according to certain embodiments. In these embodiments, intermodal inventory management system 200 utilizes at least one inventory imaging system 220 attached to a container delivery vehicle 120C (e.g., a railroad hostler vehicle) along with at least one inventory imaging system 220 coupled to a dedicated imaging vehicle 510 in order to increase coverage of container yard 100. FIG. 5A illustrates random routes of inventory imaging systems 220 attached to container delivery vehicles 120C-1 and 120C-2, and FIG. 5B illustrates the dedicated route of an inventory imaging system 220 coupled to a dedicated imaging vehicle 510. As illustrated in FIG. 5A, container delivery vehicles 120C-1 and 120C-2 traverse random routes around container yard 100 while moving shipping containers 110 to/from a train. Inventory imaging systems 220 attached to container delivery vehicles 120C-1 and 120C-2 therefore may only image a limited portion of container yard 100 during a certain time period. This may result in portions of container yard 100 not being imaged for long periods of time, thereby resulting in incorrect inventory of shipping containers 110 within container yard 100. To address these issues, some embodiments additionally or alternatively utilize an inventory imaging system 220 coupled to a dedicated imaging vehicle 510 as illustrated in FIG. 5B. Here, dedicated imaging vehicle 510 may drive a dedicated route in order to image the entire container yard 100 over a short period of times. For example, dedicated imaging vehicle 510 may traverse the entire container yard 100 once every hour. As a result, container yard 100 may be imaged more frequently and completely, thereby improving the accuracy of the inventory of container yard 100.

In the illustrated examples of FIGS. 5A and 5B, inventory imaging system 220 may perform similar or the same functions as described above in reference to FIGS. 2-3. For example, a first inventory imaging system 220 attached to a container delivery vehicle 120C-1 in FIG. 5A may: access a first plurality of images 217 that are captured by the first inventory imaging system 220 while the container delivery vehicle 120C-1 moves shipping containers 110 around the intermodal container yard 100; determine, by analyzing the first plurality of images 217 using a first machine-learning module 212, that a first shipping container 110 is depicted within at least one of the first plurality of images 217; and in response to determining that the first shipping container 110 is depicted within at least one of the first plurality of images 217, electronically communicate a first message 125 comprising data about the first shipping container to a remote computing system 210. Furthermore, a second inventory imaging system 220 attached to a dedicated imaging vehicle 510 in FIG. 5B may: access a second plurality of images 217 that are captured by the second inventory imaging system 220 while the dedicated imaging vehicle 510 drives a dedicated route to image the intermodal container yard 100; determine, by analyzing the second plurality of images 217 using a second machine-learning module 212, that a second shipping container 110 is depicted within at least one of the second plurality of images 217; and in response to determining that the second shipping container 110 is depicted within at least one of the second plurality of images 217, electronically communicate a second message 125 comprising data about the second shipping container to remote computing system 210.

Figure 6:
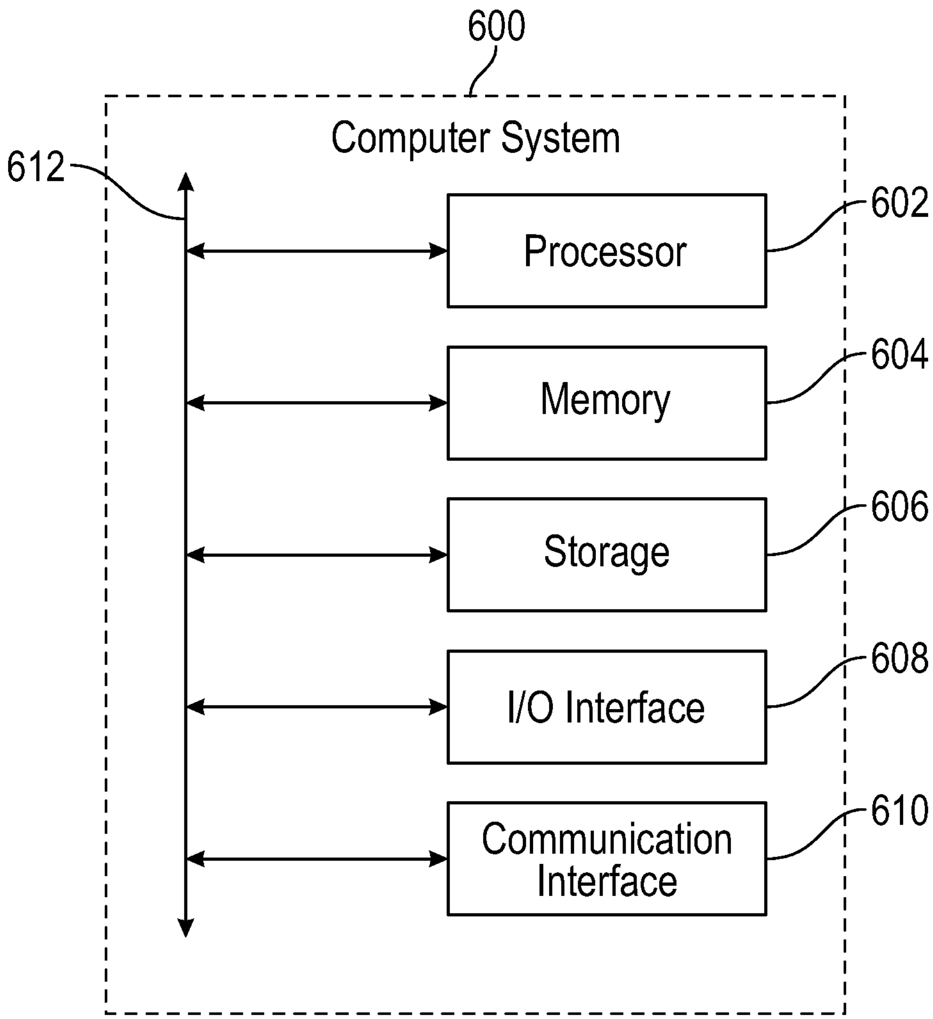
FIG. 6 is an example computer system that can be utilized to implement aspects of the various technologies presented herein, according to particular embodiments.

FIG. 6 illustrates an example computer system 600 that may be utilized as remote computing system 210 and inventory imaging computing system 250. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 can be non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). For example, the terms "processor" and "controller" can be a class of structures, rather than one specific structure, and may be defined with functional terms, but that does not make it means-plus-function. Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules disclosed herein may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. The terms Disk and disc can include compact disc (CD), laser disc, optical disc, digital versatile disc (DVD), floppy disk, and Blu-ray disc where disks usually reproduce data magnetically, while discs usually reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function, in substantially the same way, or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system comprising:

an imaging device;

a communications interface;

a Global Positioning System (GPS) module;

one or more memory units storing a map of an intermodal container yard; and one or more computer processors communicatively coupled to the one or more memory units and configured to:

access a plurality of images captured by the imaging device;

determine, by analyzing the plurality of images using a machine-learning module, that a shipping container is depicted within at least one of the plurality of images;

determine current GPS coordinates of the system from the GPS module;

determine, by analyzing the current GPS coordinates of the system, a current field of view of the imaging device;

determining, using the determined current field of view of the imaging device and the stored map of the intermodal container yard, a plurality of possible parking locations of the intermodal container yard that are within the field of view of the imaging device;

determining, from the stored map of the intermodal container yard, GPS coordinates of each of the possible parking locations that are within the field of view of the imaging device;

calculating GPS coordinates of the shipping container using one or more settings of the imaging device and the current GPS coordinate of the system;

determining the parking location of the shipping container by comparing the GPS coordinates of each of the possible parking locations with the GPS coordinates of the shipping container; and in response to determining that the shipping container is depicted within at least one of the plurality of images, electronically communicate across a communications network, using the communications interface, a message comprising data about the shipping container, the data comprising:

the determined parking location of the shipping container; and one or more identification markings of the shipping container.

2. The system of claim 1, wherein the one or more settings of the imaging device comprise a focal length of the imaging device and a resolution of the imaging device.

3. The system of claim 1, wherein:

the one or more computer processors are further configured to determine whether the system is currently located within a geofence of the intermodal container yard by comparing the current GPS coordinates of the system from the GPS module to GPS coordinates of the geofence of the intermodal container yard; and the one or more computer processors are prevented from analyzing the plurality of images using the machine-learning module when it is determined that the system is not currently located within the geofence of the intermodal container yard.

4. The system of claim 1, wherein the one or more identification markings of the shipping container are determined by the one or more computer processors using optical character recognition on the plurality of images.

5. The system of claim 1, wherein the determined parking location of the shipping container comprises:

a lot identification;

a row identification; and a spot identification.

6. A method by a computing system, the method comprising:

accessing a plurality of images captured by an imaging device, wherein the imaging device and the computing system are coupled to a vehicle that moves within an intermodal container yard;

determining, by analyzing the plurality of images using a machine-learning module, that a shipping container is depicted within at least one of the plurality of images;

determining current Global Positioning System (GPS) coordinates of the computing system from a GPS module;

determining, by analyzing the current GPS coordinates of the system, a current field of view of the imaging device;

determining, using the determined current field of view of the imaging device and the stored map of the intermodal container yard, a plurality of possible parking locations of the intermodal container yard that are within the field of view of the imaging device;

determining, from the stored map of the intermodal container yard, GPS coordinates of each of the possible parking locations that are within the field of view of the imaging device;

calculating GPS coordinates of the shipping container using one or more settings of the imaging device and the current GPS coordinate of the system;

determining the parking location of the shipping container by comparing the GPS coordinates of each of the possible parking locations with the GPS coordinates of the shipping container; and in response to determining that the shipping container is depicted within at least one of the plurality of images, electronically communicating, across a communications network, a message comprising data about the shipping container, the data comprising:

the determined parking location of the shipping container; and one or more identification markings of the shipping container.

7. The method of claim 6, wherein the vehicle comprises:

a container delivery vehicle;

an aerial vehicle;

an automobile;

a truck;

a golf cart;

an all-terrain vehicle (ATV);

an autonomous vehicle;

a motorcycle; or a remote-control vehicle.

8. The method of claim 6, wherein the one or more settings of the imaging device comprise a focal length of the imaging device and a resolution of the imaging device.

9. The method of claim 8, further comprising determining whether the computing system is currently located within a geofence of the intermodal container yard by comparing the current GPS coordinates of the system from the GPS module to GPS coordinates of the geofence of the intermodal container yard, wherein the machine-learning module is prevented from analyzing the plurality of images when it is determined that the computing system is not currently located within the geofence of the intermodal container yard.

10. The method of claim 6, wherein the one or more identification markings of the shipping container are determined by the one or more computer processors using optical character recognition on the plurality of images.

11. A system for imaging shipping containers in an intermodal container yard, the system comprising:

a first inventory imaging system coupled to a container delivery vehicle, the first inventory imaging system comprising one or more first computer processors configured to:

access a first plurality of images that are captured by the first inventory imaging system while the container delivery vehicle moves shipping containers around the intermodal container yard;

determine, by analyzing the first plurality of images using a first machine-learning module, that a first shipping container is depicted within at least one of the first plurality of images;

determining, using a current field of view of the first inventory imaging system and a stored map of the intermodal container yard, a plurality of possible parking locations that are within the field of view of the first inventory imaging system;

determining GPS coordinates of each of the possible parking locations that are within the field of view of the first inventory imaging system;

determining a parking location of the first shipping container by comparing the GPS coordinates of each of the possible parking locations that are within the field of view of the first inventory imaging system with GPS coordinates of the first shipping container; and in response to determining that the first shipping container is depicted within at least one of the first plurality of images, electronically communicate a first message comprising data about the first shipping container to a remote computing system;

a second inventory imaging system coupled to a dedicated imaging vehicle, the second inventory imaging system comprising one or more second computer processors configured to:

access a second plurality of images that are captured by the second inventory imaging system while the dedicated imaging vehicle drives a dedicated route to image the intermodal container yard;

determine, by analyzing the second plurality of images using a second machine-learning module, that a second shipping container is depicted within at least one of the second plurality of images;

determining, using a current field of view of the second inventory imaging system and the stored map of the intermodal container yard, a plurality of possible parking locations that are within the field of view of the second inventory imaging system;

determining GPS coordinates of each of the possible parking locations that are within the field of view of the second inventory imaging system;

determining a parking location of the second shipping container by comparing the GPS coordinates of each of the possible parking locations that are within the field of view of the second inventory imaging system with GPS coordinates of the second shipping container; and in response to determining that the second shipping container is depicted within at least one of the second plurality of images, electronically communicate a second message comprising data about the second shipping container to the remote computing system.

12. The system of claim 11, wherein the dedicated imaging vehicle comprises:

a second container delivery vehicle;

an aerial vehicle;

an automobile;

a truck;

a golf cart;

an all-terrain vehicle (ATV);

an autonomous vehicle;

a motorcycle; or a remote-control vehicle.

13. The system of claim 11, wherein:

the data about the first shipping container comprises:

the determined parking location of the first shipping container; and one or more identification markings of the first shipping container; and the data about the second shipping container comprises:

the determined parking location of the second shipping container; and one or more identification markings of the second shipping container.

14. The system of claim 13, wherein:

the one or more identification markings of the first shipping container are determined by the one or more first computer processors using optical character recognition on the first plurality of images; and the one or more identification markings of the second shipping container are determined by the one or more second computer processors using optical character recognition on the second plurality of images.

15. The system of claim 13, wherein the determined parking locations of the first and second shipping containers each comprise:

a lot identification;

a row identification; and a spot identification.

16. The system of claim 11, wherein the dedicated route driven by the dedicated imaging vehicle traverses the entire intermodal container yard.

* * * * *